Jan. 5, 1926.
G. W. MacKENZIE
1,568,519
LIQUID MEASURING APPARATUS
Filed April 5, 1923  4 Sheets-Sheet 2
FIG. II.
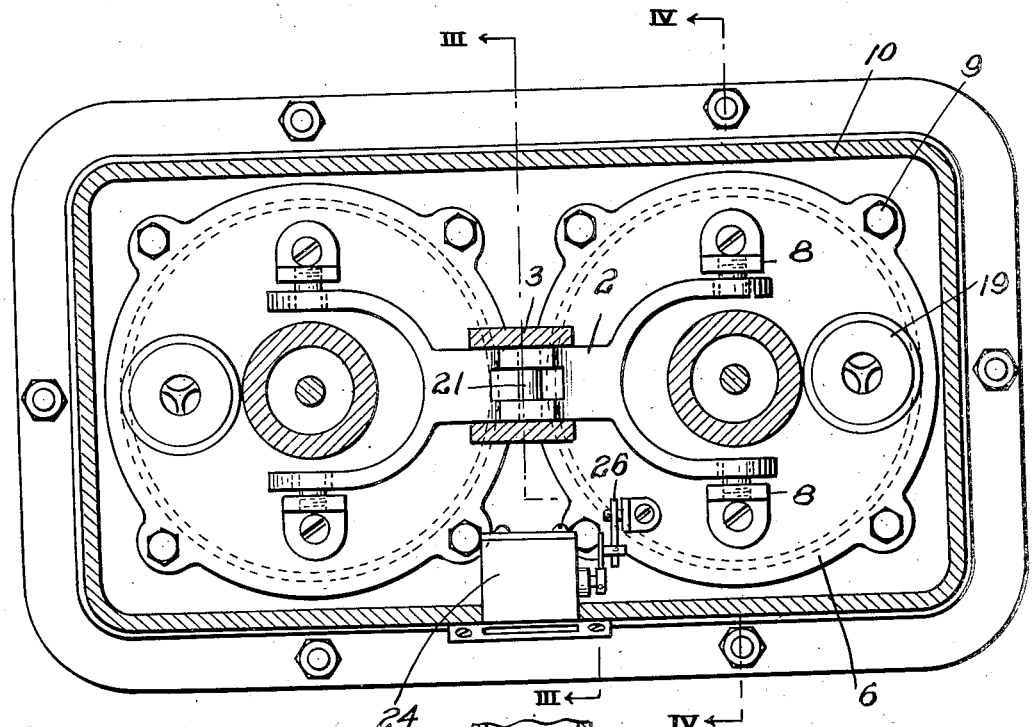
FIG. III.
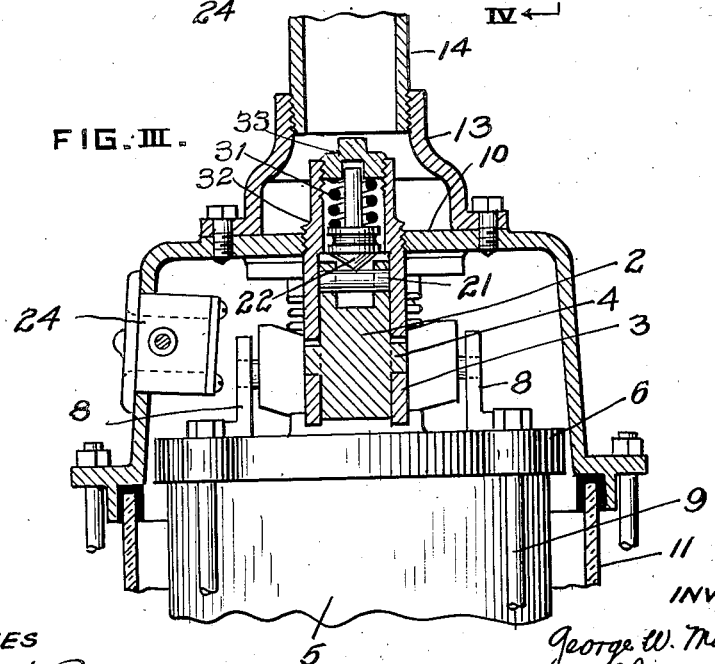
WITNESSES
INVENTOR
George W. MacKenzie
by Christy and Christy
his attorneys Jan. 5, 1926. 1,568,519
G. W. MacKENZIE
LIQUID MEASURING APPARATUS
Filed April 5, 1923   4 Sheets-Sheet 3
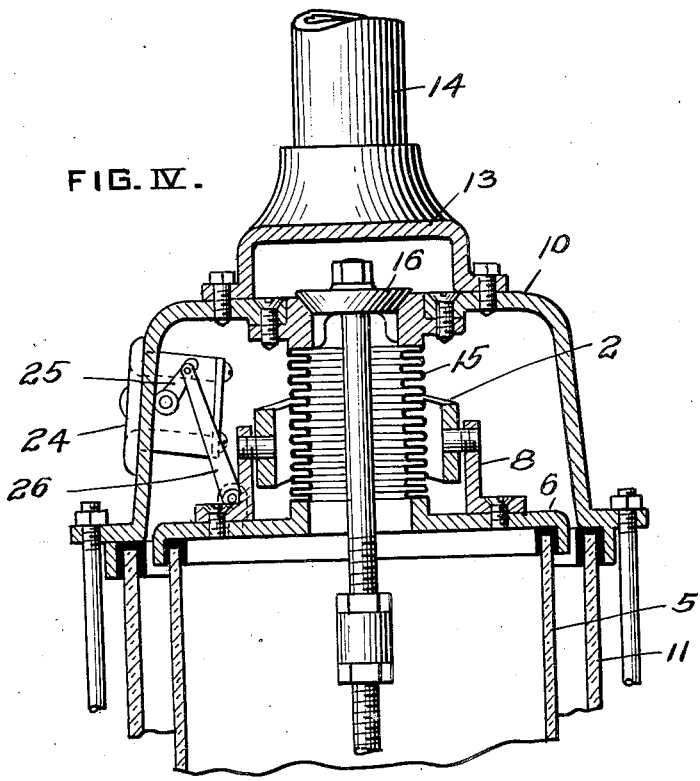
FIG. IV.
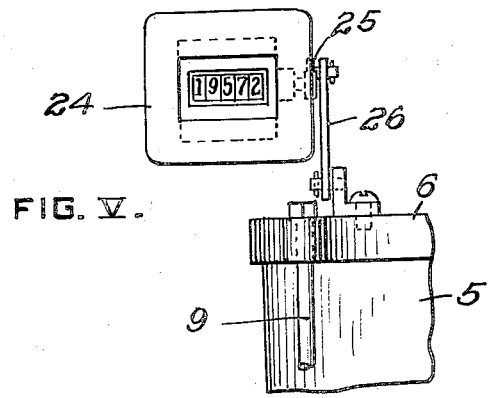
FIG. V.
WITNESSES
INVENTOR
George W. MacKenzie
by Christy and Christy
his attorneys

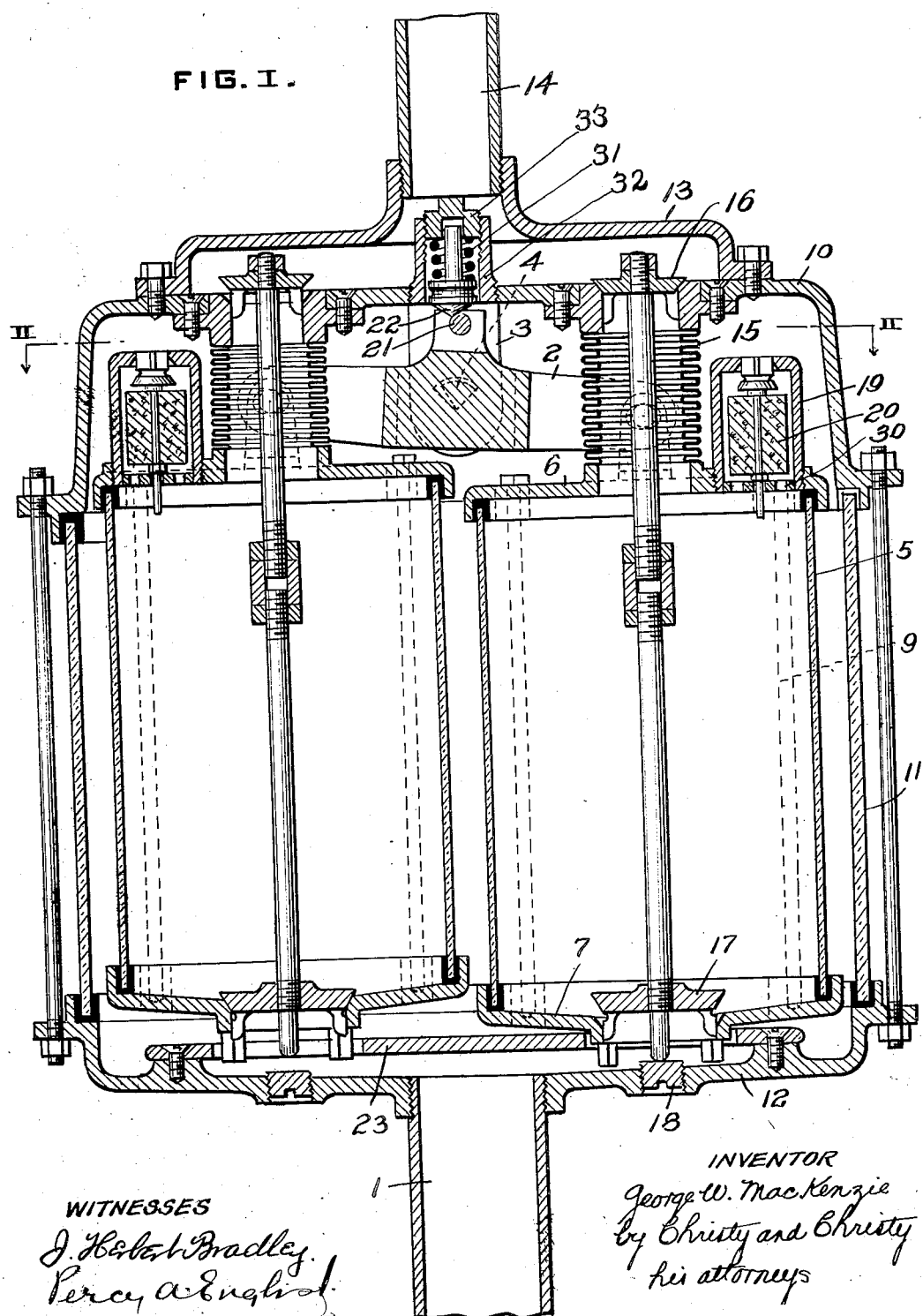

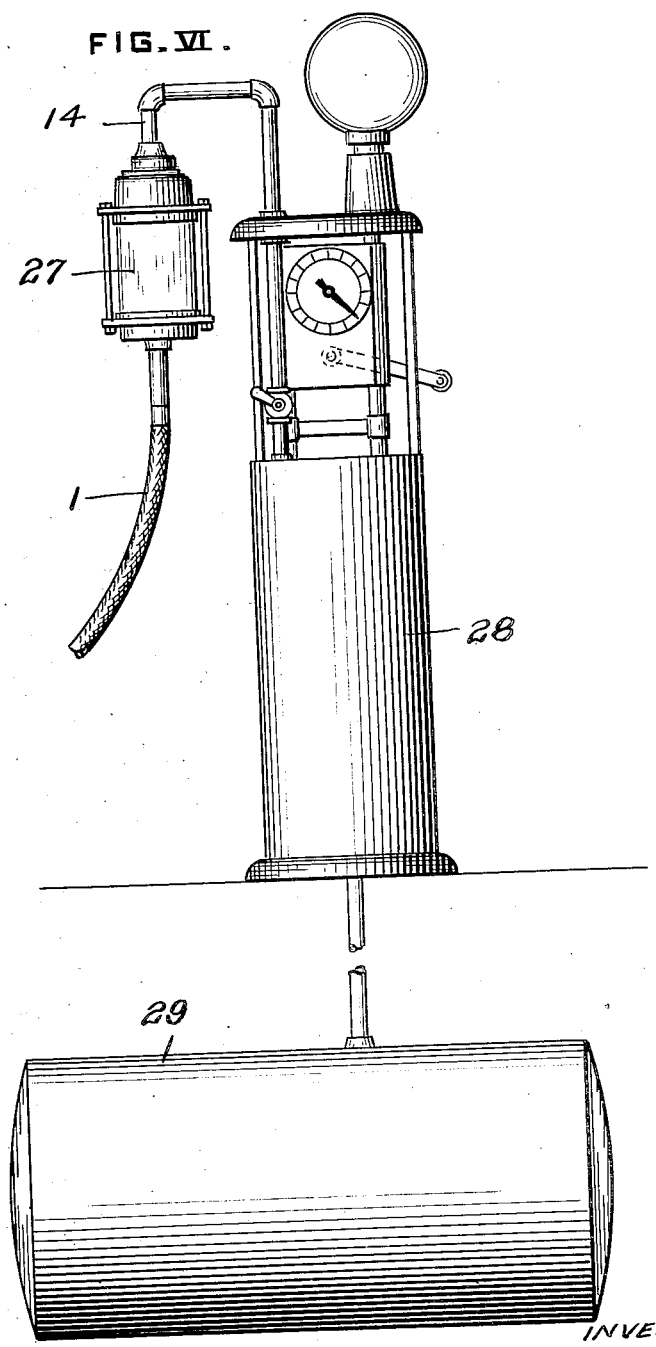

Patented Jan. 5, 1926.

1,568,519

UNITED STATES PATENT OFFICE.

GEORGE W. MacKENZIE, OF BEAVER, PENNSYLVANIA.

LIQUID-MEASURING APPARATUS.

Application filed April 5, 1923. Serial No. 630,094.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Measuring Apparatus, of which improvements the following is a specification.

In application for Letters Patent of the United States, filed August 10, 1921, Serial No. 491,114, and Letters Patent No. 1,507,704, granted September 9, 1924, I have described apparatus for measuring liquid which includes a pair of buckets hung in counterpoise from an oscillating beam, and filling and emptying as in alternation they rise and descend. My present invention has to do with apparatus of the same general character, and consists in improvements, by way of simplification of structure without loss in accuracy of measurement. The invention, like the inventions of the prior applications named, in its applicability is not limited to the measurement of any particular liquid; but finds practical use in the dispensing of gasoline, and in that particular use I shall here show and describe it.

In the accompanying drawings, Fig. I is a view in medial and vertical section of gasoline dispensing apparatus embodying my present invention. Fig. II is a view in horizontal section, on the plane indicated by the line II—II, Fig. I. Fig. III is a view in vertical section, showing the upper part of the apparatus, on the interrupted plane indicated at III—III, Fig. II. Fig. IV is a sectional view, on the plane indicated at IV—IV, Fig. II. Fig. V is a fragmentary view showing in elevation the recording mechanism. Fig. VI is a diagrammatic view, illustrating installation.

Upon a suitable support, in this case the downwardly directed delivery end of a supply pipe 14, a beam 2 is mounted for oscillation. A casing, 10, 13, whose particular features will presently be indicated, screw-threaded upon the end of this pipe, itself bears two parallel vertically extending plates 3. These plates are provided with opposite openings, in which rest the knife-edged arms 4 which extend laterally and medially from the beam 2.

The opposite ends of the beam are bifurcated, and in the bifurcations are hung in counterpoise the two buckets 5. Each bucket consists of a cylindrical wall, formed preferably of glass, to which in Figs. I, III, and IV the numeral 5 is immediately applied, and of opposite heads 6 and 7, which ordinarily will be metal castings. The glass cylinder and the metallic heads will be integrated together, with tight joints, in well known manner, and the assembly may be strengthened by bolts 9, extending between and secured to the opposite heads. These cylindrical buckets are carried in vertical position, and to this end their upper heads 6 may be provided with up-standing lugs 8, by which they are hung in the bifurcations of beam 2. The upper and lower heads of each bucket are ported, and these ports are preferably aligned vertically, and are conveniently made central in the heads. The gasoline enters the bucket through the upper port and escapes from the bucket by gravity through the lower port.

Overlying the pair of buckets is a gasoline chamber with horizontal bottom, and in this chamber bottom are formed two ports which are vertically aligned with the ports in the bucket heads. This chamber is a tight chamber formed by and between suitable castings, which are rigidly carried on the pipe 14 which, as has been said, sustains the oscillating beam 2. The preferred specific construction is that illustrated in the drawings. Similarly as each bucket is made up of a glass cylinder with cast metal heads, an enclosing casing is made up of a larger, vertically standing, all inclosing, columnar glass casing 11, similarly united and integrated with upper and lower heads. The upper head is compound, being made up really of two castings, 10 and 13. These are bolted together with tight packing in the joint between, and enclose between them the gasoline chamber, already alluded to. It is the casting 13 which, as will be seen in the drawings, is immediately carried by pipe 14. The casting 10 is that which forms the bottom wall of the gasoline chamber, and through which ports are formed, as I have remarked. The lower head is a casting 12. The upper and lower heads, bolted together, secure the casing wall 11 and integrate the whole.

The plates 3, between which beam 2 is swung, are carried by and depend from casting 10. Through the lower casing head is formed an opening from which leads the gasoline delivery pipe 1.

Vertically extensible connections establish communication between the ports in casting 10 and the ports in the bucket heads 6. The particular kind of connecting means which I here preferably employ is copper tubing whose walls are flexible and made with the accordion folds, as indicated in the drawings; such tubing is to be had in open market, under the trade-name Sylphon tube. The ends of these two lengths of tubing are united in tight joint with suitable bosses surrounding the ports in plate 10 and in the bucket heads 6. Thus communication is established between the gasoline chamber above and the two buckets 5 which oscillate vertically beneath the plate 10, and the means of communication are such as to admit of the bucket oscillation, essential to operation of the apparatus.

Two pairs of valves 16 and 17, mounted pair by pair on common stems of adjustable length control flow through the ports in casting 10 and through the ports in the lower heads 7 of the buckets, and vertically adjustable blocks 18 carried in the lower head 12 of the casing limit the downward range of valve movement. It will be perceived that, by proper adjustment of valve stem length, and of the height of blocks 18, the valve pairs will, as the beam 2 oscillates, function in the following manner: When a bucket is raised, as is the bucket on the left, Fig. I, the upper valve is open and the lower is closed; and when a bucket is down, as is the bucket on the right, the upper valve is closed, and the lower open. The distance between the valve seats varies; it is at a minimum when the bucket is up, at a maximum when it is down. The distance between the valves when once adjusted, is invariable, and is of intermediate value, between the maximum and minimum distances between valve seats.

The swinging beam with the buckets and their valve-controlled bottom ports constitutes a structure which may be termed a liquid balance. As the beam swings the bottom port of the rising bucket is closed and the bottom port of the descending bucket is opened. The increase of weight upon the raised arm of the beam, due to the accumulation of liquid, and the diminution of weight upon the lowered arm of the beam, due to the escape of liquid, tend to effect oscillation.

Upon the upper head 6 of each cylinder is mounted the casing of an overflow chamber. This conveniently takes the form of a small cylindrical casing 19. It is in communication through freely open ports with the interior of the bucket. In its upper head is formed a port. Within the overflow chamber is a float, 20, and the float carries a valve adapted, as the float rises and falls, to close the port and open it again. The gasoline enters and fills the bucket. The displaced air finds egress through this port in the overflow chamber. When the bucket is entirely filled, the still entering flood of gasoline rises in the overflow chamber, until the rising float seats the valve in the port in the head of the casing 19. Flow of gasoline ceases, and a volume of gasoline of accurately predetermined size is then segregated in the bucket. Subsequently, when the segregated volume of gasoline escapes from the bucket, the float descends and the port stands automatically open again.

The casing 19 is screw threaded into the head 6 of the bucket, as indicated at 30. It will be perceived that such connection makes possible a telescopic adjustment, and a minute standardization of the aggregate capacity of bucket and overflow chamber, to make compensation for and correct small inaccuracies, incident to manufacture.

The beam 2 carries medially, and elevated above its center of oscillation, a horizontally and transversely extending rod. It may be a freely turning roller 21, carried by upstanding arms. The casting 10 carries a spring-backed vertically movable downwardly impelled bolt 22 with conical, that is to say wedge-shaped, lower head. This head engages rod 21 and bears upon it with spring tension throughout all the range of beam oscillation. It will be remarked that thus spring tension is exerted to resist oscillation during the first half of each swing, and that it is exerted to aid oscillation during the second half of the swing. As shown in the drawings, the plates 3 already mentioned are mounted immediately upon a plug 32, screw threaded into casting 10, which plug carries the spring-backed bolt 22. The drawings show also means for adjusting the spring tension under which bolt 22 functions. The plug 32 is essentially a hollow cylinder within which an abutment 33 is screw threaded and by such screw-thread mounting is adjustable. The bolt 22 moves axially within the plug and is yieldingly held to engagement with the roller 21, by means of a spring 31 which bears upon the adjustable abutment 33. By the adjustment of the positions of the abutment 33, the amount of tension of spring 31 upon bolt 22 in its engagement with roller 21 may be varied.

The outer casing is at the bottom provided with means for guiding the buckets in their vertical reciprocation. Upon the lower head 12 of the casing, within and at an interval above, a plate 23 is carried. This plate is provided with guide orifices in which play extensions from the bottoms of the buckets.

Upon the outer casing (preferably within and conveniently beneath plate 10) a tally 24 is rigidly mounted. A crank arm 25 extending from the operating shaft of this tally is, by the link 26, connected to one of the reciprocating buckets. This tally registers both on the forward and retrograde turning of its shaft. Accordingly, with each bucket shift, both descent and rise, the tally is advanced one degree. By such means indication may automatically be given of the number of units consecutively segregated and delivered.

Fig. VI shows the assembly. A pump fixture 28 stands above an underground tank 29. To the delivery pipe 14 from the pump the dispensing fixture 27 in which my invention resides is secured, and from this pipe it is hung. The usual hose for delivery of gasoline to a customer leads from delivery pipe 1. Through the pipe connections indicated the pump in its operation draws gasoline from the supply tank and delivers it under pressure to the dispensing fixture 27. Through the delivery pipe 1 the measured gasoline passes to the customer's car.

It will be understood that, if the tank 29 were sufficiently elevated, pump 28 might be dispensed with, and the gasoline supplied by gravity to the dispensing fixture, under sufficient head to make effective the apparatus described.

And, of course the dispensing apparatus need not be hung from a pipe-end; it may be supported in any suitable and preferred way.

It remains to describe the operation of the apparatus, and in this description certain coordination of the mechanical parts already described, will be indicated.

In my prior applications mentioned above, in which a liquid balance is shown and described as part of the apparatus, the gasoline as it is delivered is by the balance segregated into units of weight, and these segregated units are then measured volumetrically. In the apparatus of my present application the liquid balance is constructed and organized to segregate accurately defined units of volume, and the indicator employed merely takes account of the number of oscillations of beam 2.

The apparatus is intended to be used in cooperation with a pump or equivalent arrangement for supplying gasoline under head or pressure, and, standing at the curb of a highway or in another convenient place, to serve primarily as gasoline dispensing apparatus. A "blind" pump, as it is called, is merely a pump for withdrawing gasoline from a suitable reservoir and delivering it to a consumer. The pump is so constructed that, in purpose and intent it will with each stroke deliver a predetermined unit of volume. Such pumps as they continue in service are liable to become inaccurate, and, furthermore, the operator may in the use of them wilfully give short measure. My improved apparatus is intended to be used with a pump, and, if it be superadded to the dispensing apparatus known as the blind pump, affords check upon it, and correction of inaccuracies. If my apparatus be made as I intend with transparent-walled buckets and transparent casing, it is possible to see that full measure is given, and there is guard against fraud. The presence of the apparatus of my invention, superadded to the familiar blind pump, will in no degree retard nor complicate delivery.

In installation the apparatus may be arranged, as I have said, hung from a supply pipe 14. The pump by means of which gasoline is drawn from the source of supply and driven forward under pressure is connected to this supply pipe. (This supply pipe 14 is, in a typical installation an inch-and-a-quarter pipe, while the delivery 1 is a two-inch pipe.)

When the pump is operated a stream of gasoline under pressure flows through pipe 14 and enters the gasoline chamber formed by and between castings 10 and 13. This chamber is, so long as operation continues, always filled with gasoline. From this chamber the gasoline flows through one or the other of the ports guarded by valves 16; for these valves are opened and closed in alternation. Passing through this port the stream of gasoline descends by gravity and fills the underlying bucket. As the bucket fills the displaced air escapes through the port in the auxiliary casing 19. When the cylinder is filled, the flood of gasoline rising in the auxiliary chamber raises the float and seats the float-borne valve, closing the port. As has been intimated, in installation of the apparatus, the casing 19 has been so minutely adjusted in its connection to the bucket head, that the bucket chamber with the overflow chamber together are of exactly the desired volume. Pressure imposed by the pump then accumulates, and when it has increased to a certain degree, the bucket just filled having up to this moment stood in elevated position, the resistance afforded by the spring-backed bolt 22 is overcome, and hydraulic pressure and gravity cooperate to expand the length of tubing 15, and the filled bucket descends. In the latter half of its descent, the spring backing exerted upon bolt 22 aids in the progress.

As the bucket descends the inlet valve above closes and the outlet valve below opens, and with the opening of the lower valve the segregated and accurately measured unit of gasoline escapes from the bucket and flows by gravity through delivery pipe 1 to the waiting automobile, or other receptacle. The valve in auxiliary chamber 19 falls away, allowing free ingress of air as the gasoline flows out.

The same swing of beam 2 which is involved in the descent of the filled bucket causes the companion bucket, previously emptied by gravity, to rise. Its discharge valve 17 closes, its inlet valve 16 opens, and the operation is then repeated; and the alternate filling and emptying of the buckets continues, so long as the pump is driven.

It is important to note that the filled cylinder does not begin its descent until after it has been completely filled and after filling pressure has accumulated upon the body of liquid segregated on the delivery side of the pump; this because of the presence and effect of the spring backed bolt 22, which bears upon the roller 21 borne by beam 2. By this provision the exact volume of gasoline segregated in the buckets in normal operation may be minutely controlled, and, being so minutely controlled, may be accurately predetermined.

I so minutely adjust the length of the stems of valves 16, 17, that when, in the course of swing, the beam 2 comes exactly to mid-position, in which it extends horizontally, both the upper valves 16 are slightly open. The object is to utilize the hydraulic pressure from the pump to carry the beam surely across a dead center, and also to crack the valve 16 of the rising bucket before the full pressure can be exerted upon it, tending to prevent its rise. I so minutely adjust the abutments 18 in their vertical position with relation to the valve stems that, as beam 2 swings beyond its mid-position, and valve 16 closes, the valve 17 of the descending bucket opens.

In the embodiment of the invention which I have actually designed, each bucket in its functioning segregates exactly one gallon. Precision is got by adjustment of casing 19.

I have said that I contemplate use of the apparatus as a fixture at a curbstone, for dispensing gasoline to customers at a service station. Manifestly it may be employed in filling such a storage tank as 29, and manifestly it is applicable, wherever liquid of any sort flowing in a stream and under pressure or head is to be measured.

I claim as my invention:

1. In liquid-dispensing apparatus the combination of a conduit for liquid, a liquid balance in communication with said conduit and including an oscillating beam and a pair of liquid containers born in counterpoise by said beam, means opposing a yielding resistance to beam oscillation, and means for rendering the said liquid balance responsive to the hydrostatic pressure of a stream of liquid supplied through said conduit.

2. In combination with means for delivering liquid under pressure, liquid-dispensing apparatus including a liquid-containing chamber with which said means of delivery are in communication, a pair of buckets hung in counterpoise beneath said liquid-containing chamber and reciprocable in alternation vertically beneath said chamber, each of said buckets, otherwise closed, being provided with an upper inlet opening, a lower discharge opening, and an automatically closing vent, vertically extensible, fluid-tight connection between said liquid-containing chamber and the inlet opening of each bucket, and means operative as the buckets reciprocate for closing alternately the inlet and outlet openings thereof, substantially as described.

3. In combination with means for delivering liquid under pressure, liquid-dispensing apparatus including a liquid-containing chamber with which said means of delivery are in communication, a pair of buckets hung in counterpoise beneath said liquid-containing chamber and reciprocable in alternation vertically beneath said chamber, each of said buckets, otherwise closed, being provided with an upper inlet opening, a lower discharge opening, an upper vent, and a float valve controlling said vent, vertically extensible, fluid-tight connection between said liquid-containing chamber and the inlet opening of each bucket, and means for resisting bucket reciprocation, substantially as described.

4. In liquid-dispensing apparatus the combination of a beam pivoted in a support, a pair of measuring buckets hung from said beam at its opposite ends, each of said buckets, otherwise closed, being provided with an inlet port, an outlet port, and an overflow port, a conduit leading from a source of liquid supply to the inlet port of each bucket, means for closing the outlet port and opening the inlet port and alternately, as the beam swings, opening the outlet port and closing the inlet port, and a float valve controlling the overflow port.

5. In liquid-dispensing apparatus the combination of a beam pivoted in a support, a pair of measuring buckets hung from said beam at its opposite ends, each of said buckets, otherwise closed, being provided with an inlet port, an outlet port, and an overflow port, a conduit leading from a source of liquid supply to the inlet port of each bucket, means for closing the outlet port and opening the inlet port and alternately, as the beam swings, opening the outlet port and closing the inlet port, a float valve controlling the overflow port, and adjustable means for resisting beam swing.

6. In liquid-dispensing apparatus the combination of a beam pivoted in a support, a pair of measuring buckets hung from said beam at its opposite ends, each of said buckets being provided with an inlet port and an outlet port, and means for closing the outlet port of a raised bucket and the inlet port of a lowered bucket while leaving unclosed the inlet ports of both buckets when the beam is in mid-position.

7. In liquid-dispensing apparatus the combination of a beam pivoted in a support, a pair of measuring buckets hung from opposite ends of said beam, means for alternately filling and emptying said buckets in alternation as they rise and descend in accordance with beam-swing, an abutment borne by said beam above its pivot point, and a spring backed bolt extending from a support immovable with respect to the support upon which said beam is pivoted, and yieldingly engaging said abutment.

8. In liquid-dispensing apparatus the combination of a support, a beam pivoted to said support, measuring buckets hung from said beam at opposite ends, means for alternately filling and emptying said buckets in alternation as they rise and descend in accordance with beam swing, an abutment borne by said beam above its pivot point, and a wedge-headed bolt borne by said support and extensible under spring pressure vertically downward in a line vertically above the point of beam pivoting.

In testimony whereof I have hereunto set my hand.

GEORGE W. MacKENZIE.